Nov. 12, 1968

JEAN-PIERRE LOUIS-RODOLPHE HARIVEL 3,410,726
ELECTRIC CELL WITH WATER REPELLANT COATED POROUS
LAYER AND METHOD OF MAKING SAID LAYER

Filed May 17, 1966 3 Sheets-Sheet 1

INVENTOR
JEAN-PIERRE LOUIS-
RODOLPHE HARIVEL

ATTORNEYS

Nov. 12, 1968

JEAN-PIERRE LOUIS-RODOLPHE HARIVEL 3,410,726

ELECTRIC CELL WITH WATER REPELLANT COATED POROUS
LAYER AND METHOD OF MAKING SAID LAYER

Filed May 17, 1966

INVENTOR
JEAN-PIERRE LOUIS RODOLPHE HARIVEL

BY *Kenyon & Kenyon*

ATTORNEYS

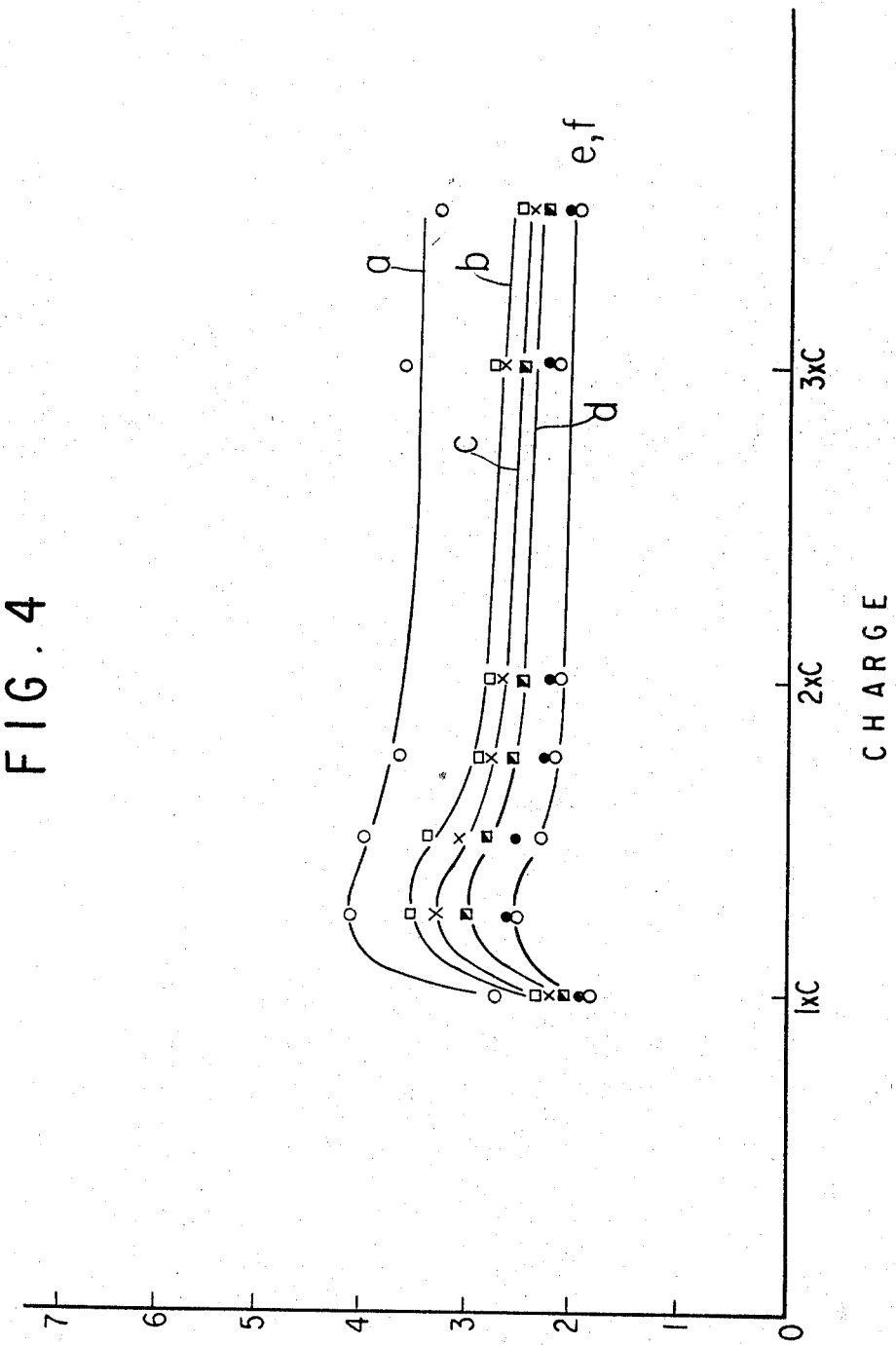

United States Patent Office 3,410,726
Patented Nov. 12, 1968

3,410,726
ELECTRIC CELL WITH WATER REPELLANT COATED POROUS LAYER AND METHOD OF MAKING SAID LAYER
Jean-Pierre Louis-Rodolphe Harivel, Paris, France, assignor to Societe des Accumulateurs Fixes et de Traction (Societe Anonyme), Romainville, Seine-St.-Denis, a company of France
Filed May 17, 1966, Ser. No. 550,728
Claims priority, application France, May 25, 1965, 18,404; Feb. 21, 1966, 50,462
29 Claims. (Cl. 136—6)

ABSTRACT OF THE DISCLOSURE

Electric cell construction using thin electrodes and separators and permitting high intensity charging current to reduce materially the length of charging time without harmful evolution of gases within the cell involving positioning of a porous layer of finely divided material which is more electropositive than the metallic active material of the negative electrode adjacent one face at least of one or more negative electrodes, the layer being impregnated with a small amount of water repellant in sufficient amount only to prevent complete flooding of the pores with electrolyte so that both gaseous and liquid phases may exist in said layer, thus promoting and accelerating oxygen consumption at the negative electrode while leaving the electrical resistance of the porous layer substantially unchanged. Preparation of the porous layer by deposition on a fibrous support by dissociation of a salt of the selected metal with accompanying precipitation or piston spraying or plating and subsequent impregnation with limited quantities of water repellant are disclosed. The electrode porous layer assemblies are compressed in a sealable container to which electrolyte is added in quantity only sufficient to fill all pores of the electrodes and separator but care is taken that there is no free electrolyte and the container then sealed. Cells embodying the invention can be charged with a current whose intensity may rise as high as C amperes, where C is the rated capacity expressed in ampere-hours of the cell without harmful evolution of gases in the sealed cell. The cells may be sealed or semi-sealed storage cells utilizing thin sintered electrodes bearing active materials or cells of similar type whose electrodes do not contain active material, viz. electrolytic cells and the electrodes may be flat or spirally wound up together and the cells may be of alkaline nickel-cadmium or silver-cadmium types.

---

This invention relates to electrolytic and storage cells and more particularly to sealed or semi-sealed cells of this type.

Storage cells, especially cadmium-nickel alkaline cells, have already been designed in such a manner that the oxygen which is evolved from the positive electrodes at the end of the charging can be consumed at the negative electrodes owing to secondary reactions. At said end of charging, the charging current will no longer increase the polarization of the negative electrodes, and, as these contain generally an excess of active material, i.e., have a greater charge capacity than that of the positive electrodes, the state of complete charge of the negative electrodes is never attained, thereby preventing the evolution of hydrogen.

The evolution of gases at the end of charge being thus limited, the casings of such cells can be hermetically closed. Alternatively, as is known, the casings can be provided with a valve which opens only when the gas pressure within the casing becomes greater than a predetermined fixed value.

In some types of alkaline cadmium-nickel cells, the transport of oxygen from the positive electrodes to the negative electrodes at the end of the charge of the positive electrodes is effected in the gaseous state owing to the fact that a separator situated between these electrodes comprises hollow portions or spaces that are large enough so as not to be completely filled with electrolyte as a result of capillary action, thus providing free channels for traverse of gaseous oxygen.

In other alkaline cells, on the contrary, the separators have only capillary pores which, being completely filled with electrolyte, prevent the transport of oxygen in the gaseous state but promote the transfer of this oxygen in the dissolved state in the electrolyte. The thinness of their electrodes which are generally each constituted of a very thin carrier of sintered nickel impregnated with appropriate active material in its pores, is such that for a given capacity a cell of such a type, it has a very large surface area of electrodes. The relatively low charging current intensity which results from this fact, and most important the very narrow gap of a few tenths of a millimeter which is maintained between the opposite polarity electrodes by thin separators and achieved by compressing the block of separators and electrodes, are all factors which promote the transport of oxygen in the dissolved state.

However, with many of the hitherto known storage cells in which irreversible phenomena have to be prevented at the end of charging, these storage cells must be charged, using a current which is only a small fraction of the rated capacity of the cells. This necessitates a long charging period and is, of course, a serious drawback for users of such cells.

If the charging of such cells is effected at too high a rate, at the end of charge, gaseous oxygen may be seen to be evolved in substantial amounts from the block of electrodes and separators. This oxygen which has not been resorbed has its origin in the fact that the rate of oxygen consumption at the negative electrodes or in the cathodic compartment is less than the rate of formation of oxygen at the positive electrodes. In fact, hydrogen may even be evolved at the negative electrodes since the accumulation of oxygen under pressure causes a delay in the depolarization of the negative electrodes.

This invention relates to an improvement allowing a very substantial increase of the intensity of the charging current in a storage cell, especially at the end of the charge, so that consequently the length of the charging time can be materially reduced without any apparent harmful evolution of gases in the casing of the cell. This improvement applies to any kind of storage cells whether sealed or semi-sealed, and is more particularly applicable to cadmium-nickel and cadmium-silver storage cells. It also applies to the electrolytic cells.

According to a first embodiment of this invention, a porous layer of a finely divided metal which is more electropositive than the metallic active material of the negative electrode is impregnated with a water repellent material, the said porous layer being positioned in the cell adjacent to one face, at least, of the negative electrodes thereof.

If the negative electrodes comprise cadmium as the negative active material, it is particularly advantageous to use silver as the metal more electropositive than the cadmium, but other metals can be used such as copper, nickel, cobalt, platinum and palladium.

The layer of metal more electropositive than cadmium can be provided on a porous support or member that preferably is fibrous, such as a felt or a fabric made of synthetic materials such as, for instance, polyamids, of asbestos, carbon, or even iron, the said metal layer being prepared and deposited as by dissociation of a salt of the selected metal together with accompanying precipitation of this metal, or by Shoop piston spraying, or by electroplating, or by any other suitable means.

This porous layer can also be made directly of a felt of fibres of the selected metal, or of any other kind of fibres plated with the selected metal, for instance, carbon or iron fibres plated with silver, nickel, copper, cobalt, platinum or palladium.

When this porous layer is placed between a positive electrode and a negative electrode, it is obviously necessary to insulate the said layer from the positive electrode by means of a porous insulating separator which is generally positioned between the electrodes in these storage cells.

An advantage of the fibrous structure of the porous support, or of the metal layer itself, lies in the fact that the fibres even if plated, can move relatively freely and thus can slip or change their shapes allowing the electrolyte, more particularly the water content thereof which is involved in the electrochemical reactions, to flow easily.

In addition, a water repellent material is used with the porous layer. This water repellent material can be, for instance, polystyrene or polytetrafluoroethylene (trademark "Teflon").

Only small amounts of this water repellent material must be absorbed by the porous layer or by the electropositive material deposited thereon because it is imperatively necessary that the small metal particles either of this layer or metallic deposit should be in electrical contact with the small particles of cadmium, or of the metal constituting the carrier of the negative electrodes, in such a manner that the electrical couples so formed may discharge on short-circuits wherever the said porous layer is applied against a negative electrode.

The function of the water repellent material seems to be to prevent the complete flooding of the pores in the porous layer of the electropositive metal so that both gaseous and liquid phases may co-exist.

An advantage of this embodiment of the invention is found to be the very good results obtained when a water repellent material is used in the porous layer applied in the form of a diluted solution of the said material in a volatile solvent which solvent is subsequently dried off.

Promotion of oxygen consumption at the negative electrode by use of a porous layer of a finely divided metal that is more electropositive than the metal constituting the negative active material can be effected if this layer is placed in contact with the negative electrodes. Particularly, this electropositive metal can be silver when the negative material is cadmium.

The porous layer of the electropositive metal can be placed on the side facing the negative electrode of a separator insulating this electrode from the adjacent positive electrode, or more preferably on an insulating carrier distinct from the separator, as has been described in copending application, Ser. No. 525,193, filed Feb. 4, 1966, entitled "Electric Storage Cells."

In the same field, the present invention in another aspect relates to the fact that the consumption of oxygen is carried on more easily in contact with the negative electrode when the metal more electropositive than the metallic negative active material, at least in the case of cadmium, is partly or completely replaced by carbon in a divided state.

Preferably, the carbon is in the form of graphite, and is advantageously made of entangled fibres of graphite constituting, for instance, a fabric or a felt thereof that is flexible and slightly compressible.

According to this second embodiment of the invention, a sheet of fabric or felt made of graphite fibres is placed in contact with one negative electrode, at least, in the cell, either, for instance, between the said electrode and the separator which insulates the adjacent positive electrode, or in contact with the outer face of at least one of the negative electrodes in a block. The thickness of this fabric or felt of graphite, which may be in an uncompressed state a few tenths of millimeter, is reduced by compression against the associated negative electrode.

A further feature of this second embodiment, provided to increase the catalytic effect, consists in plating the fibres of graphite, more or less completely with a metal more electropositive than the metal of the metallic negative active material, being, for example, silver, nickel, palladium, platinum, copper or cobalt.

On the other hand, the first embodiment of the invention noted above discloses an improvement comprising the making water repellent of the porous layer of the more electropositive metal by application of a thin coating also porous of a water repellent material, such as polystyrene or polytetrafluorethylene, this treatment leaving the electrical resistance of the porous layer practically unchanged.

This thin water repellent coating can also be advantageously applied to a porous carbon layer such as, for instance, a fabric or a felt made of graphite fibres whether or not it has been plated.

Another feature of this invention generally is to arrange the said porous layer by which the consumption of oxygen is accelerated, the said layer comprising either electropositive metal or carbon, in such a manner that it projects into the free space occupied by the gases inside the casing or alternatively presents a free surface in this space. Since this free space contains oxygen at a partial pressure having a variable more or less high value depending on the charge state of the cell, the portion of the porous layer situated in this free space will promote the ionization of the oxygen due to the presence of the three phases — conducting solid/liquid electrolyte/gas — by which the consumption of oxygen is accelerated.

The support for the porous layer of electropositive metal, or of carbon, in these conditions will be of larger dimensions than those corresponding to the electrodes, in such a manner that a portion of this layer, or of this fabric, projects into the inner free gas space of the casing.

Other objects, features and advantages of this invention will become apparent from the following specification and the accompanying drawings forming a part hereof, and wherein:

FIGURE 4 is a graph illustrating performance data obtained with cells of this invention.

Figure 1:
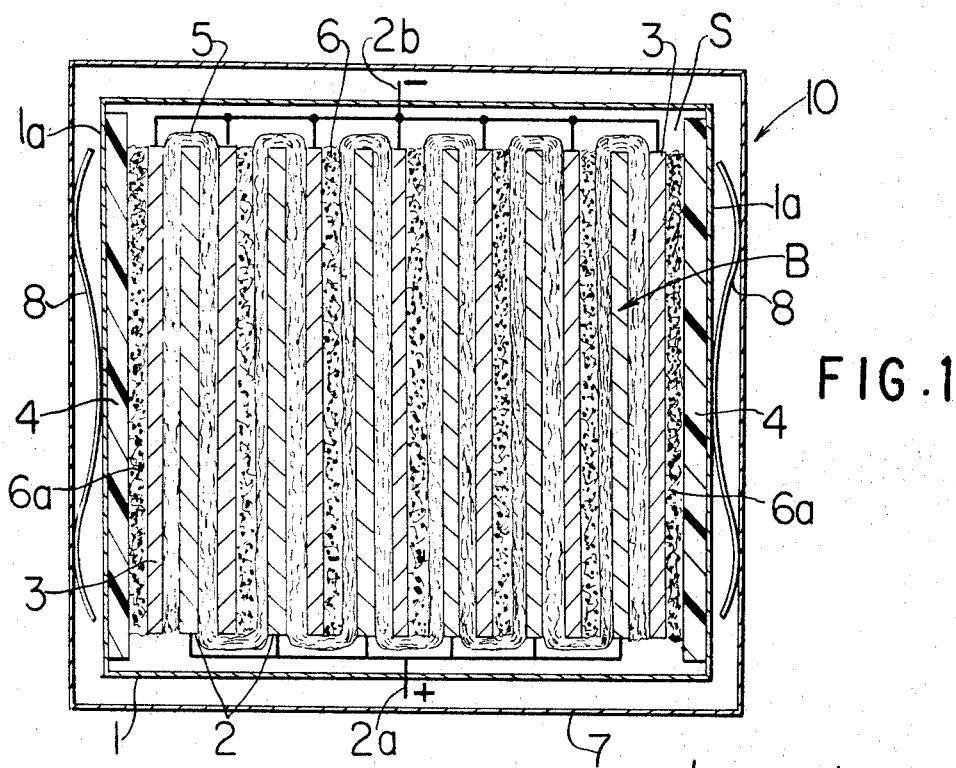
FIGURE 1 is a diagrammatic section of a cell embodying the invention.

Referring to FIGURE 1, the storage cell 10 shown diagrammatically comprises an hermetically sealed casing 1 containing a block of six positive electrodes 2 parallelly connected to a terminal 2a and seven negative electrodes 3 parallelly connected to a terminal 2b, the outer electrodes 3 of the block B being negative electrodes insulated from the walls 1a of the casing 1 which is usually made of metal, as by two sheets 4 of insulating material. Certain details immaterial to the understanding of the present invention have been omitted from FIGURE 1 in the interest of clarity.

The respective electrodes 2 and 3 comprise sintered nickel plates impregnated with active material, viz nickel hydroxide to which cobalt hydroxide may be added for the positive electrodes 2, and cadmium hydroxide for the negative electrodes 3. The sintered nickel plates are of the thin type, those for the positive electrodes 2 being about 0.9 mm. in thickness and those for the negative electrodes 3 being about 0.8 mm. in thickness.

In another example constituting an embodiment of the invention, the metallic active material of the positive electrode 2 comprises active silver such as silver oxide.

Electrodes 2 and 3 of opposite polarities in the block are separated by a porous insulating separator 5 made, for example, of felt, blotter material or woven fabric formed from fibres of synthetic material such as "nylon." If desired, the separator 5 may comprise two juxtaposed layers, one made of a "nylon" fabric and the other of a felt. The thickness of the separator 5 is always small, i.e., in the range of 0.1 to 0.3 mm. As shown in FIGURE 1, the separator 5 may be a continuous band folded in zig-zag manner between the electrodes 2 and 3. Alternatively, it may be made of individual sections placed one by one between the adjacent electrodes of opposite polarity.

A carrier 6 bearing porous layer deposited thereon and comprising a finely divided metal more electropositive than cadmium, such as silver, is disposed in contact with each negative electrode 3. Each of these carriers 6 bearing the porous layers may be prepared in the following manner:

A porous insulating carrier 6 preferably having the same dimensions as the negative electrodes 3 and made of a nylon felt material which has a thickness of about 0.1 to 0.2 mm. when uncompressed is provided. This carrier 6 is then impregnated with a silver nitrate solution at a concentration of 50% by weight, then removed from the solution and after a short dripping time in air it is immersed at room temperature (about 20° C.) in an hydrazine solution at a concentration of 50% by volume. This immersion lasts for about 1 minute during which time the hydrazine solution is stirred. Silver nitrate is thus dissociated and the resulting reduced silver metal is precipitated in a porous divided state on the surface of the fibres of the carrier 6 according to the reaction

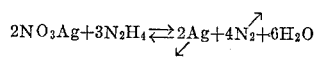

$$2NO_3Ag + 3N_2H_4 \rightleftharpoons 2Ag + 4N_2 + 6H_2O$$

The carrier 6 is then removed from the hydrazine solution, washed with a large amount of water until it is free of hydrazine and is then left to drip. After completion of this dripping, the above-described cycle is repeated several times in order to increase the amount of silver metal deposited or plated onto the porous carrier 6.

It has been found advantageous for obtaining the desired results to attain a thickness of the plated silver of about 1 to 4 gm. per dm.$^2$ of carrier surface.

The repetitive cycles are finally followed by drying for about 15 hours at about 70° C.

The carrier 6 thus obtained comprising the deposited porous layer of finely divided silver has a very low electrical resistivity so that, when placed, for instance, between two metal plates it constitutes between these two plates a conducting bridge of practically negligible resistance.

An examination of this carrier by a microscope has shown that silver had penetrated its thickness.

The following operations are involved to complete this carrier. It consists in impregnating the porous layer bearing carrier 6 with a water repellent material such as polystyrene or polytetrafluorethylene in volatile solvent to provide a coating whose thinness remains sufficiently small to maintain the low value of electrical resistivity of the carrier.

For example, the carrier 6 bearing the porous silver layer is immersed at room temperature into a solution of polystyrene at a concentration of 1% by weight in volatile trichloroethylene solvent (or in butanone-2). Thereafter, the removal of the solvent is effected by air drying or evaporation for about six hours at a temperature not higher than 50° C.

The low electrical resistance of the carrier 6 is not changed by this treatment because the polystyrene is deposited mostly as a very thin porous coating finely distributed along the inner walls of the silver layer pores which thus are still kept open. As a result of such a treatment, this carrier meets the specific requirements of this invention.

The concentration of the polystyrene solution can be as high as 15% by weight in the solvent without any inconvenience, if desired.

Several porous carrier 6 thus prepared are placed in the cell as shown in FIGURE 1, each carrier 6 being sandwiched between the active material of a negative electrode and the separator 5, in such a manner that the layer of finely divided silver of the carrier is adjacent to the surface of the active material of the adjoining negative electrode without, however, touching the adjacent positive electrode owing to the presence of the separator 5. For both end negative electrodes of the block B, it is possible to place the carriers 6 against their outer surfaces as shown at 6a in FIGURE 1 in order to control the oxygen which may be present in the free space S of the cell around the electrodes.

The storage cell 10 is provided before sealing with an amount of electrolyte required which is just sufficient to fill all the pores present in the electrodes, the separator 5 and the porous layer 6 despite the coating of water repellent material. There must be no free electrolyte in the cell, the whole amount thereof being retained in the pores.

The block B composed of the electrodes 2, 3, the separator 5 and the carriers 6 and 6a containing the divided silver is maintained under pressure in the electrodes so that the adjacent surfaces are engaged with one another as tightly as possible. The insulating sheets 4 may play a part in the compression if they are given a suitable thickness. Moreover, the walls 1a of the casing 1 parallel to the electrodes 2 and 3 may cooperate with a pressure means situated outside the casing, these walls being made of steel sheets that are sufficiently flexible to transmit compressing pressure that may be exerted on the block. Such pressure exerting means may comprise a belt 7 enclosing the casing 1 with the interposition of plate-springs 8 between this belt and the outer walls of the casing 1. Such pressure exerting means are well known in the art.

Due to the fact that the porous layer bearing carrier 6 including the nylon felt of the carrier and the deposited divided silver or other electropositive material is more or less flexible, as would be a felt made of metallic fibres alone without any insulating substratum, and, according to a different embodiment of the invention, it is possible for this layer 6 to be in thoroughly close contact with the negative electrode 5, in spite of bumps on their surfaces because of the effect of pressure exerted on the block B.

A storage cell 10, constituted as described above, having a rated capacity of C ampere-hours, can be charged at a current of intensity C/2 amperes, and even at C amperes, since no dangerous internal pressure inside the hermetically sealed casing may occur either at the end of charging or on overcharging. But with the omission of the porous carriers 6 or 6a, such high charging current intensities would give very sharp and dangerous pressure increases.

Thus, it can be seen that the results provided by the invention are very outstanding and unexpected considering the fact that hitherto the charging rate of storage cells of such a type has had to be limited at the end of the charge to less than one-tenth of the rated capacity.

Such a performance may be explained by the following discussion which, in no way, should be regarded as restricting the invention.

The oxygen evolved at the end of the charge by the positive electrode of the storage cell diffuses towards the composite negative electrode comprising both silver and cadmium particles, the said cadmium being obtained from the reduction due to the charging current in the cell.

In the presence of finely divided silver having been chemically plated and of the electrochemical couple originated between this silver and the cadmium, the oxygen coming from the positive electrode in the state of overcharge according to the reaction:

$$2OH^- \rightarrow H_2O + O + 2e \quad (1)$$

will be reduced on the cathode of the local silver/cadmium couple where the following reaction will take place:

$$\tfrac{1}{2}O_2 + H_2O + 2e \rightarrow 2OH^- \quad (2)$$

At the anode of this local couple, the cadmium will be oxidized by the hydroxyl ions supplied by reaction (2), according to the reaction:

$$Cd + 2OH^- \rightarrow Cd(OH)_2 + 2e \quad (3)$$

Consequently, the formation of silver-cadmium local couples considerably increases the rate of oxygen reduction according to reaction (2). It is thus possible to obtain an equilibrium between the rate of reaction (3) which is the absorption at the negative electrodes of the oxygen evolved at the positive electrode at the end of charging, and that of the reaction:

$$Cd(OH)_2 + 2e \rightarrow Cd + 2OH^- \quad (4)$$

which corresponds to the charge of the negative electrode.

Due to the highly conductive contact between the cadmium of the negative electrode and the silver of the adjacent porous layer, the small local silver/cadmium couples have a maximum output intensity and the rate of consumption of oxygen coming from the positive electrode can be very high, thus allowing a high charging rate.

The fact that the phenomenon thus added to the operation of the cell has a greater effect than that of the small electrochemical couples also present and constituted by the particles of nickel and cadmium, may be explained since the treatment for impregnating the sintered plates during the manufacture of the cell bring about a surface attack on the nickel particles thus preventing a highly conductive electrical contact with the cadmium.

It is probable that the water repellent material coating deposited in the pores of the carrier and being very thin, is consequently itself very porous and allows the keeping in the pores of small spaces that are free from electrolyte which promote locally the co-existence of the three phases noted as necessary to the equilibrium of the reactions.

This invention may have many embodiments applicable to storage cells of many designs which have not been described hereinabove.

Several metals of the kind mentioned and each more electropositive than cadmium might be present at the same time on the carrier 6 which is in contact with the negative electrode 3.

Figure 2:
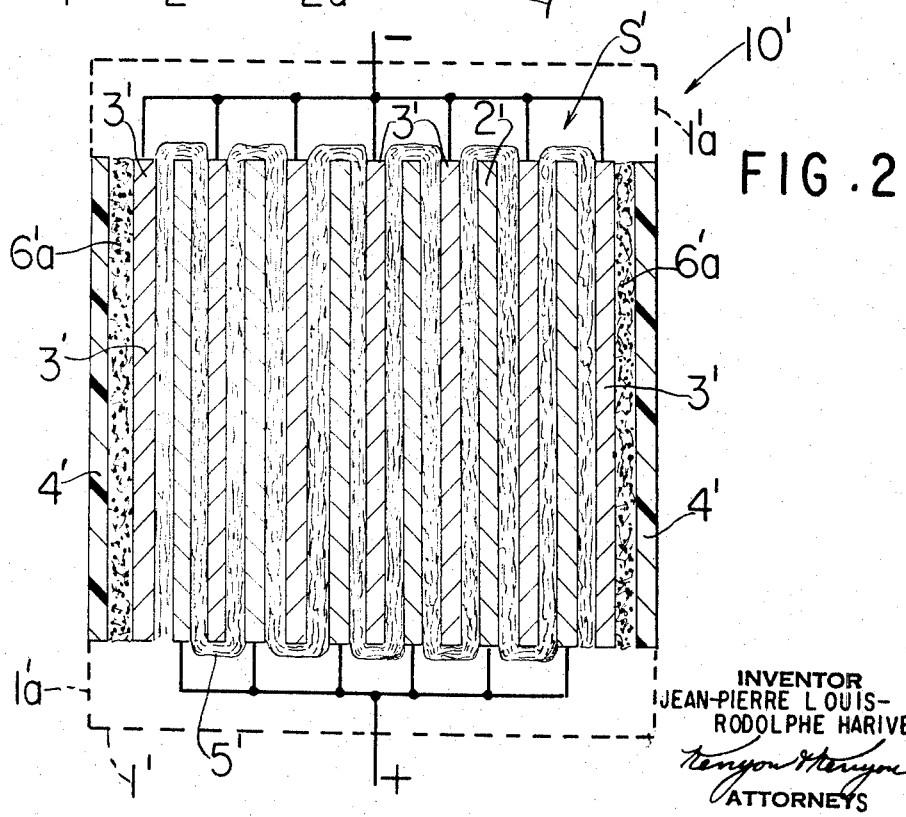
FIGURE 2 is a similar section of another cell embodying the invention.

In a different modification of the invention, as seen in FIG. 2, in the cell 10', the carrier 6'a bearing the porous divided metal layer is positioned solely adjacent to the outer surfaces of one or more of the outer negative electrodes 3' provided that the oxygen evolved from the positive electrode 2' can have access to the said divided metal.

FIGURE 2 shows, for instance, in cell 10' which is semi-sealed or hermetically sealed, the porous carrier 6a with divided porous silver and with larger water repellent material positioned on the outer free surfaces of the outer negative electrodes 3', inside the casing 1', provided that on these surfaces, the electropositive metal is in close contact with the negative active material of said negative electrodes 3' in its reduced state at the end of the charge. In this case, oxygen which might be evolved towards the end of the charging and go into the free space S' of the casing is dissolved in the electrolyte contained in the porous carrier 6'a and comes to the interface between the finely divided silver contained in the carrier 6'a and the negative electrodes 3'. It is then resorbed and the pressure in the storage cell 10' is thus limited to the value for which there is an equilibrium between the evolution and the resorption of the oxygen.

Another feature of this invention is that it also can be used in cells having sintered plates that do not bear active materials, viz, in plates of electrolytic cells. In such cases, the local couples are formed by the metal particles of the sintered plate of such electrolytic cell which is negatively polarized, and the metal particles on the carrier plated according to this invention.

Figure 3:
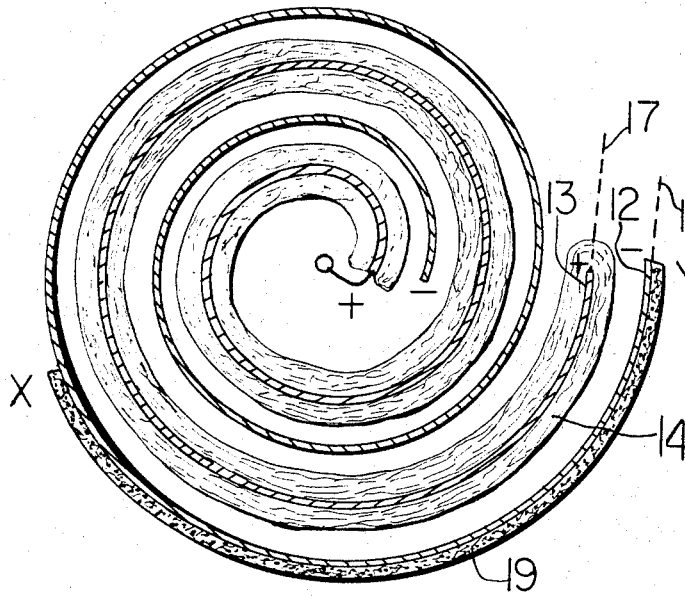
FIGURE 3 is a section of a further cell embodying the invention.
Figure 3A:
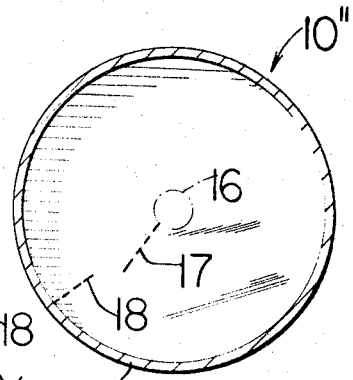
FIGURE 3a is a section of the casing used with the cell of FIGURE 3.

FIGURES 3 and 3a refer to an embodiment of the invention where the storage cell 10" is comprised of spirally wound electrodes and a separator.

The embodiment therein shown comprises a negative electrode 12 and a positive electrode 13 both constituted by a thin and flexible strip of porous sintered nickel bearing respective metallic negative and positive active materials, the thickness of each of which is not greater than 0.8 and 0.9 mm. as noted above regarding electrodes 2 and 3.

Between the electrodes 12 and 13 an insulating porous separator 14 is positioned, which is constituted as already noted as by a felt, a blotter material or a synthetic fibrous fabric having a thickness of from about 0.1 to 0.3 mm.

The electrodes 12 and 13 and the separator 14 are spirally wound, as shown in FIGURE 3, the negative electrode 12 being longer than the positive electrode 13 because of the fact that the arc of the spiral described by the negative electrode 12 is longer than that of the positive electrode 13. Nevertheless, FIGURE 3 is only a diagrammatic view wherein the spacing between the respective turns of the two electrodes has been exaggerated in the drawing in comparison with the real thickness of the electrodes, for purposes of clarity. Practically, the spiral winding should be effected as tightly as possible in order to compress the separator 14 between the electrodes 12 and 13, the final diameter of the spiral winding being so reduced as to be squeezeable into the cylindrical metal casing 15, FIGURE 3a, the diameter of which is made to be the smallest possible consonant with such requirements. With this type of spiral winding, the last or outer turn of the negative electrode 12 is not covered by the separator 14 and lies in close contact with the inside wall of the casing 15. Thus, the said casing 15 may itself constitute the negative terminal whilst the positive terminal 16 is situated at the center of a cover (not shown) which is electrically insulated from the casing 15 and which is connected through a conductor 17 insulated from the casing 15 and connected to the positive plate 13. It is advantageous also to connect the negative electrode to the casing 15 as by a lead 18 to secure a better electrical connection. Naturally, the separator 14 must completely enclose the two faces of the positive electrode 13 to the spiral winding in such a manner that the positive and negative turns in the winding are well insulated from each other. The carrier 19 for the porous electropositive layer comprises material similar to that of carriers 6 or 6a as described above bearing a porous silver layer or other electropositive metal of the type named and a deposited coating of a water repellent material made in the same way as carrier 6. The carrier 19 is positioned on the external face of the outer negative turn along the arc x–y of electrode 12 which remains uncovered after a tight winding of the electrodes and separator and is positioned between the outer face of the winding and the said casing 15.

As previously described, the storage cell 10" contains prior to sealing, just that amount of electrolyte necessary to fill all available pores present in the electrodes 12 and 13 as well as in the separator 14 and the carrier 19. There should be no free electrolyte in the cell, the whole amount present being retained in the pores.

FIGURE 4 illustrates the important advantageous results obtained by practice of this invention, being a diagram of the pressure build-up in the cells comprised of wound electrodes as described in relation to FIGURES 3 and 3a, under a charging current of C amperes, C being the rated capacity of the cell expressed in ampere-hours. Ordinates correspond to the pressure in bars inside the casing 15 measured with a pressure gauge connected to the casing, and the abscissae are the amount of electricity charged during the time of charging.

The curves a, b, c, e, f, in FIGURE 4 respectively show the build-up of pressure in such cells.

Curve a is for a storage cell where the carrier 19 contained only a porous silver layer in the proportion of 1.30 gm. per dm.$^2$, no water repellent material coating being provided.

Curve b is for a similar cell wherein the same carrier 19 has been immersed after application of the porous silver plating layer in a water repellent solution of polytetrafluoroethylene as herein described.

Curve c is for a cell wherein the carrier 19 contained a similar proportion of silver, i.e., 1.30 gm. per dm.$^2$, as the cell of curve a and additionally had been immersed once in a 1% solution of polystyrene.

Cure d is for a similar cell where the same carrier 19 had been twice immersed in a 1% solution of polystyrene.

Curve e is for a cell wherein the carrier 19 contained a porous layer of silver in the proportion of 4 gm. per dm.$^2$ and had been immersed once or twice in the 1% solution of polystyrene.

Curve f, is for a cell wherein the carrier 19 contained a porous layer of silver in the proportion of 3.3 gm. per dm.$^2$ and had been subsequently subjected to one or two impregnations of 1% polystyrene.

It can be seen firstly that the presence of the carrier 19 containing the porous silver layer placed in contact with a negative electrode 12 as described with respect to FIGS. 3 and 3a gives an outstanding result, since the charging and overcharging current at C amperes yields a stabilized pressure that is not higher than 4 bars, which is a reasonable and safe pressure value.

It also can be observed that the deposit of a water repellent material coating on the porous layer of the carrier 19 lowers still more the final cell pressures to a point well below 3 bars even when the overcharging current is C amperes.

Figure 5:
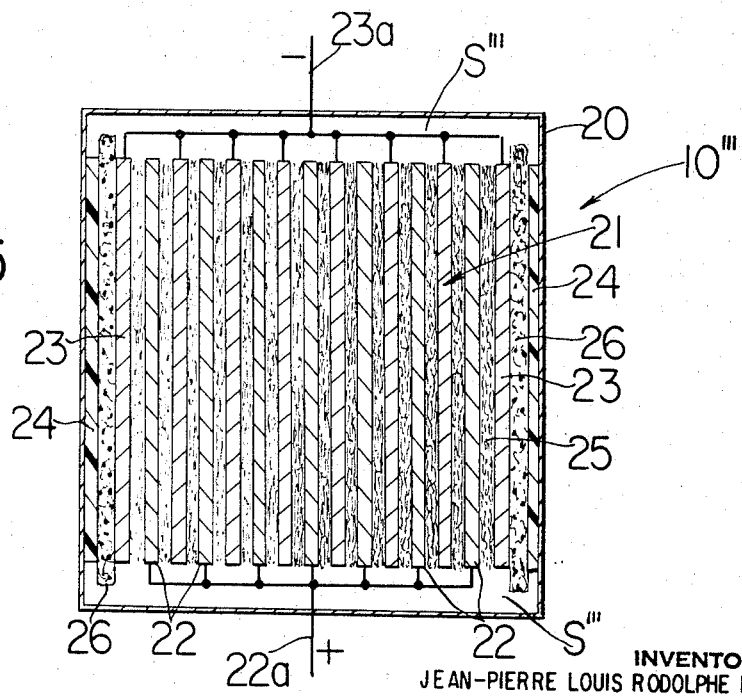
FIGURE 5 is a section of yet another cell embodying the invention.

As pointed out above, in one aspect of the invention, the carrier can simply be a sheet of fabric or felt comprised of graphite fibres as is illustrated in FIGURE 5. Herein, again, the cell 10''' shown diagrammatically comprises the hermetically sealed casing 20 comprising a block 21 of several positive electrodes 22 parallelly connected to a terminal 22a, and a larger number of negative electrodes 23 parallelly connected to a terminal 23a, the outer negative electrodes of said block being insulated from the casing 20 as by two sheets of porous insulation material 24.

The respective negative and positive electrodes 22 and 23 are of the same material as specified for the positive and negative electrodes 2 and 3 of FIGURE 1 and likewise are separated by porous insulation separator 25 of the same material and thickness as separator 5 being in the form of separate individual sheets as shown in FIGURE 5.

A porous carrier layer 26 in the form simply of a sheet of fabric or felt comprised of graphite fibres is disposed at least between the outer faces of the outermost of said negative electrodes 23 and the sheets of porous insulating material 24. The carrier layers 26 are a few tenths of a millimeter thick which is reduced in assembly of the block 20 by compression as described regarding the cell of FIG. 1. The peripheral dimensions of layers 26 is greater than those of the electrodes so that the edges of said layers 26 projected into the free spaces S''' within the cell casing 20, so that the projecting portions of said layer 24 in said free spaces S''' will promote ionization of oxygen in such free spaces to accelerate consumption of said oxygen as hereinabove described.

As with porous carrier 6, the porous layer 26 of graphite fabric or felt fibres may have a porous layer of a metal, such as silver, nickel, palladium, platinum, cobalt or copper that is more electropositive than the metal of the negative active material applied thereto by the cyclic process described for such application herein with respect to the porous carrier 6.

In addition, the graphite layer 26 alone, or such a layer 26 bearing porous metal deposited thereon by said cyclic process likewise may have thin porous water repellent coatings applied thereto which may be of the same water-repellent materials as applied to carrier 6 and deposited in the same way.

A cell with spirally wound electrodes similar to that of FIGURES 3 and 3a may be constituted utilizing a porous layer-like porous layer 26 in place of the porous carrier 19.

Cells like those of FIG. 5 and like those of FIGS. 1, 2, 3 and 3a utilizing porous layers 26 instead of porous carriers 6 and 6a, will exhibit the superior charging characteristics noted in FIGURE 4 with respect to the cell of FIGS. 3 and 3a in which pressures developed during charging and particularly near the end of charge and overcharge will be well below 4 bars and in a range low enough to permit hermetic sealing or semi-sealing of their casings and safe operation even when charging at the rated capacity C of these cells.

The principles of this invention are applicable not only to alkaline nickel-cadmium storage cells but also to silver-cadmium storage cells and to electrolyte cells whose positive and negative sintered plates contain no active materials.

While specific embodiments of the invention have been described, variations in practice within the scope of the appended claims are possible and are contemplated. There is no intention of limitation to the exact disclosure herein presented.

In all modifications, it is contemplated that the negative electrodes will bear an excess of negative active material as compared with the active material borne by the positive electrodes.

What is claimed is:

1. In an electric cell having thin porous positive and negative electrodes bearing respectively metallic compound positive and negative active materials, and a thin porous separator between the electrodes, a porous conductive felted fibrous carrier distinct from the separator positioned against one face of at least one negative electrode and in contact therewith, said carrier containing a metal more electropositive than the metal of the active negative material, electrolyte in said cell sufficient only to fill pores of said electrodes, separator and carrier, and said porous carrier having a thin limited coating on walls of its pores of water repellant sufficient only to enhance catalytic properties of the metal contained by the carrier and without preventing passage of liquids and gases through said carrier.

2. In the electric cell according to claim 1, said carrier being composed of carbon fibres.

3. In the electric cell according to claim 1, said water repellent coating thereon comprising material selected from the group consisting of polystyrene and polytetrafluoroethylene.

4. In the electric cell according to claim 1, said porous carrier being of fibrous material and bearing a porous metallic layer and said thin water repellent coating being on the walls of pores of said layer.

5. In the electric cell according to claim 4, said porous metallic layer being of a metal selected from the group consisting of silver, copper, nickel, cobalt, platinum and palladium.

6. In the electric cell according to claim 5, said metallic layer containing at least from 1 to 4 gms. of the selected metal per dm.$^2$ of surface.

7. In the electric cell according to claim 1, said porous carrier being of fibrous metallic material and said water repellent coating being on the walls of the pores of said carrier.

8. In the cell according to claim 7, said metallic fibrous material being of metal selected from the group consisting of silver, copper, nickel, cobalt, platinum and palladium.

9. In the electric cell according to claim 1, means for pressing the electrodes, separator and porous carrier together.

10. In the electric cell according to claim 1, said electrodes separator and porous carrier being spirally wound together.

11. In the electric cell of claim 1, said porous carrier lying between said face of said negative electrode and the separator between it and the adjacent positive electrode.

12. In an electric cell having thin porous positive and negative electrodes bearing respective positive and negative materials, a porous separator between respective positive and negative electrodes, a porous carbon layer positioned adjacent a face of at least one of the negative electrodes so that said layer is in contact with the negative active material thereof, electrolyte filling only the pores of the electrodes, separator and layer, and said layer having a limited amount of thin water repellent coating on walls of its pores, sufficient only to enhance catalytic properties of the layer and without preventing passage of gases and liquids through said layer.

13. In the electric cell of claim 12, said carbon layer being of graphite.

14. In the electric cell of claim 13, said graphite being in the form of fibres.

15. In the electric cell of claim 14, said fibres bieng entangled.

16. In the electric cell of claim 12, said carbon layer being of graphite fibres bearing a plating of a metal that is more electropositive than the negative active material.

17. In the electric cell of claim 12, said water repellent coating being selected from the group consisting of polystyrene and polytetrafluoroethylene.

18. In an electrical cell having a casing adapted to be at least semi-sealed and having a free gas space therein, thin porous positive and negative electrodes bearing respectively metallic compound positive and negative active materials, thin porous separators between adjacent positive and negative electrodes, a porous fibrous layer selected from the group consisting of carbon and metals that are more electropositive than the metal of the negative active material positioned so that said layer is in contact with the negative active material of the negative electrode on at least one face thereof with said porous layer projecting beyond the surface of said electrode into said free gas space to present a free surface therein to gas occupying said space within said cell, said layer having a limited amount of thin water repellent coating on walls of its pores sufficient only to enhance catalytic properties of the layer and without preventing passage of gases and liquids through said layer, and electrolyte in said cell only in pores of the electrodes, separator and layer.

19. In the electric cell of claim 18, wherein said electrodes are of the thin sintered nickel type and wherein said metallic compound active positive materials are selected from the group consisting of nickel and silver compounds and said negative active material is cadmium, said metals of said porous layer that are more electropositive than the metal of the negative active material being metals selected from groups consisting of silver, copper, nickel, cobalt, platinum and palladium.

20. A method for preparing a porous layer of electropositive metal in a finely divided state for use in an alkaline electric cell having positive and negative electrodes comprising the steps of providing a fibrous carrier, applying the porous metallic layer as a plating deposit on the fibrous carrier, thereafter impregnating the layer bearing fibrous carrier with a limited quantity of a water repellent material in a volatile solvent and thereafter evaporating the solvent so as to leave a thin limited water repellent coating on the walls of the pores of the layer which is insufficient to affect the electrical contact resistance of the porous layer and insufficient to prevent passage of gases and liquids through said layer.

21. The method of claim 20 wherein the water repellent material is selected from the group consisting of polystyrene and polytetrafluoroethylene.

22. The method of claim 20 wherein the water repellent material is polystyrene and the volatile solvent therefor provides a solution whose concentration lies between 1% and 15% by weight.

23. That improvement in preparing a porous member for interposition between positive and negative electrodes of a cell comprising providing a porous conductive carrier, impregnating said carrier with a limited quantity of water repellent material in a volatile solvent and thereafter evaporating the solvent so as to leave a thin water repellent coating on the walls of the pores of said member, which is insufficient to affect the electrical contact resistance of the carrier and insufficient to prevent passage of gases and liquid through said carrier.

24. The improvement of claim 23 wherein the porous conductive carrier is carbon and said water repellent material is selected from the group consisting of polystyrene and polytetrafluoroethylene.

25. The improvement of claim 24 wherein said carbon is graphite in fibrous form.

26. The improvement of claim 23 wherein said positive and negative electrodes contain metallic active materials, and including the step of impregnating said porous member with a salt solution of a metal more electropositive than the negative metallic active material, then the step of dissociating said salt to precipitate its metal content as a finely divided porous layer on said porous member prior to the said impregnation of said carrier with said water repellent material.

27. The improvement of claim 26 wherein said metallic salt solution is of silver nitrate and wherein said dissociation is effected by a hydrazine solution.

28. The improvement of claim 27 wherein said silver nitrate solution has a concentration of about 50% by weight and wherein said hydrazine solution is at substantially room temperature and has a concentration of about 50% by volume.

29. The improvement of claim 26 wherein said steps are effected cyclically.

References Cited

UNITED STATES PATENTS

| | | | |
|---|---|---|---|
| 2,951,106 | 8/1960 | Ruetschi | 136—6 |
| 2,980,745 | 4/1961 | Peters | 136—1 |
| 2,980,747 | 4/1961 | Daley | 136—6 |
| 3,057,943 | 10/1962 | Strauss | 136—6 |
| 3,193,412 | 7/1965 | Salkind et al. | 136—6 |

WINSTON A. DOUGLAS, *Primary Examiner.*

D. L. WALTON, *Assistant Examiner.*